(12) United States Patent
Shimizu

(10) Patent No.: US 12,436,425 B2
(45) Date of Patent: Oct. 7, 2025

(54) LIGHT EMITTING APPARATUS AND DISPLAY APPARATUS

(71) Applicant: Saturn Licensing LLC, New York, NY (US)

(72) Inventor: Takaharu Shimizu, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 16/640,111

(22) PCT Filed: Jul. 10, 2018

(86) PCT No.: PCT/JP2018/026000
§ 371 (c)(1),
(2) Date: Feb. 19, 2020

(87) PCT Pub. No.: WO2019/049505
PCT Pub. Date: Mar. 14, 2019

(65) Prior Publication Data
US 2020/0278582 A1    Sep. 3, 2020

(30) Foreign Application Priority Data
Sep. 5, 2017   (JP) ................. 2017-170521

(51) Int. Cl.
*G02F 1/13357* (2006.01)
*G02F 1/1335* (2006.01)

(52) U.S. Cl.
CPC .. *G02F 1/133606* (2013.01); *G02F 1/133562* (2021.01); *G02F 1/133603* (2013.01);
(Continued)

(58) Field of Classification Search
CPC ......... G02F 1/133504; G02F 1/133607; G02F 1/133562; G02F 1/133536; G02B 6/0053; G02B 5/045
See application file for complete search history.

(56) References Cited

U.S. PATENT DOCUMENTS

| 6,276,803 B1 * | 8/2001 | Aoyama | G02B 5/045 348/E5.139 |
| 2001/0030638 A1 * | 10/2001 | Kashima | G02B 5/045 345/102 |

(Continued)

FOREIGN PATENT DOCUMENTS

| JP | 2001312914 A | 11/2001 |
| JP | 2009300508 A | 2/2009 |

(Continued)

OTHER PUBLICATIONS

International Search Report for Application No. PCT/JP2018/026000 mailed Oct. 2, 2018, 2 pages.
(Continued)

*Primary Examiner* — Alexander P Gross
(74) *Attorney, Agent, or Firm* — Richard LaPeruta

(57) ABSTRACT

A light emitting apparatus includes: a liquid crystal section having a liquid crystal layer between a first surface and a second surface that face each other; a light emitting section that has a light output surface and outputs light from the light output surface with respect to the first surface in an oblique direction, in which the light output surface faces the first surface of the liquid crystal section; and an optical component facing the second surface of the liquid crystal section and having an interface, in which the interface is inclined with respect to the second surface and has different refractive indices.

20 Claims, 13 Drawing Sheets

(52) U.S. Cl.
CPC .. *G02F 1/133504* (2013.01); *G02F 1/133607* (2021.01); *G02F 2202/28* (2013.01)

(56) References Cited

U.S. PATENT DOCUMENTS

| | | |
|---|---|---|
| 2003/0048400 A1 | 3/2003 | Kim et al. |
| 2005/0041311 A1* | 2/2005 | Mi .................. G02B 6/0053 359/831 |
| 2007/0223247 A1* | 9/2007 | Lee .................. G02B 5/045 362/614 |
| 2008/0129931 A1* | 6/2008 | Takahashi .......... G02B 5/3058 359/487.03 |
| 2008/0259243 A1* | 10/2008 | Ohta .................. G02B 5/045 349/64 |
| 2009/0027591 A1* | 1/2009 | Hwang ............. G02F 1/133504 349/64 |
| 2009/0116221 A1* | 5/2009 | Sato .................. G02B 5/045 362/257 |
| 2012/0320311 A1 | 12/2012 | Gotou et al. |
| 2013/0010227 A1* | 1/2013 | Wang .................. G02B 6/0053 349/61 |
| 2013/0016312 A1* | 1/2013 | Kim .................. G02F 1/137 349/97 |
| 2014/0235896 A1 | 8/2014 | Sugitani |
| 2016/0154147 A1 | 6/2016 | Kwon |
| 2016/0252665 A1* | 9/2016 | Lee .................. G02B 5/305 359/489.07 |
| 2017/0153363 A1* | 6/2017 | Lee .................. G02F 1/133606 |
| 2017/0242302 A1* | 8/2017 | Asakawa .......... G02F 1/133504 |
| 2019/0285246 A1* | 9/2019 | Yamamoto ......... G02B 27/0977 |

FOREIGN PATENT DOCUMENTS

| | | |
|---|---|---|
| JP | 2013003258 A | 1/2013 |
| JP | 2014186045 A | 10/2014 |
| JP | 2014235896 A | 12/2014 |
| WO | WO-2005005881 A1 | 1/2005 |
| WO | 2012008212 A1 | 1/2012 |
| WO | 2016158834 A1 | 10/2016 |
| WO | WO-2016175580 A1 | 11/2016 |

OTHER PUBLICATIONS

Extended European Search Report including Written Opinion for EP18854849.9 issued May 29, 2020; 9 pages.
Joo, B. Y. et al., "Design guidance of backlight optic forimprovement of the brightness in the conventional edge-lit LCDbacklight", Displays Devices, Dempa Publications, Tokyo, JP, vol. 31, No. 2, Apr. 1, 2010, pp. 87-92, ISSN:0141-9382.2.

* cited by examiner

[FIG. 1]
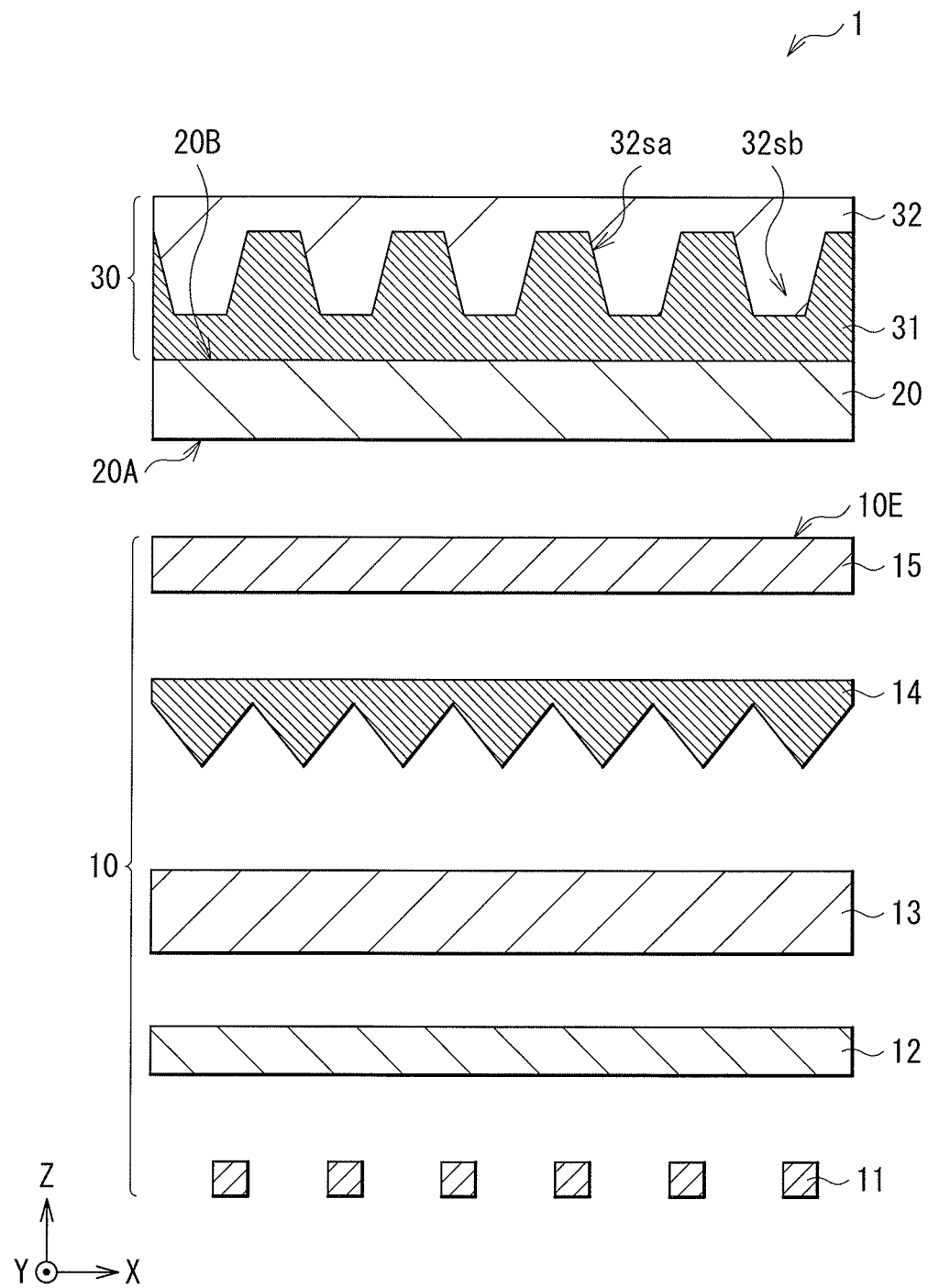

[FIG. 2]
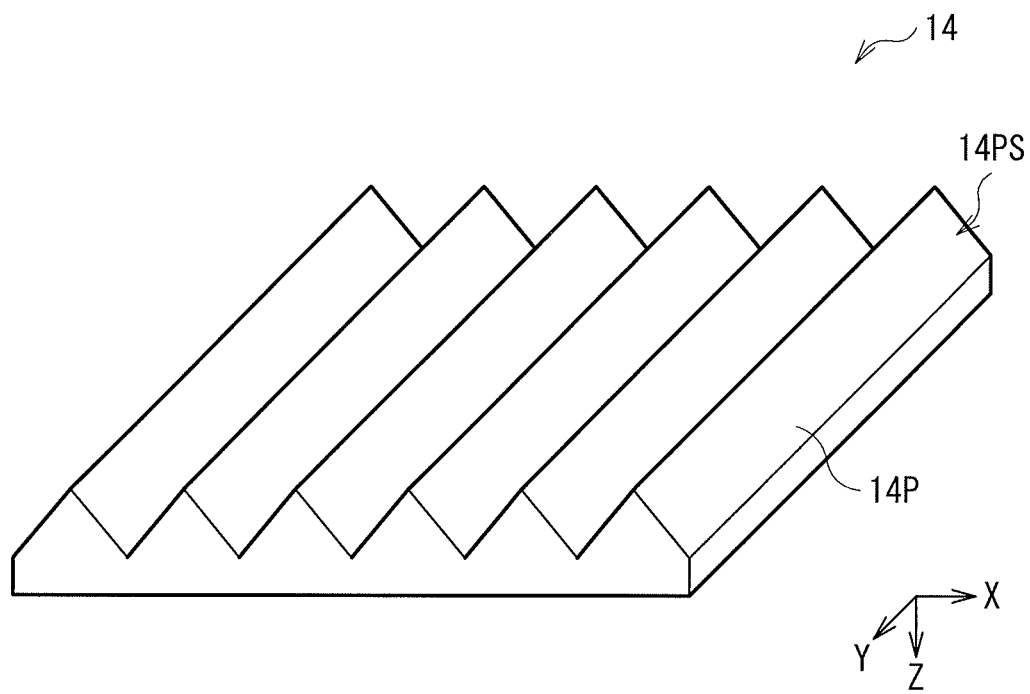
[FIG. 3]
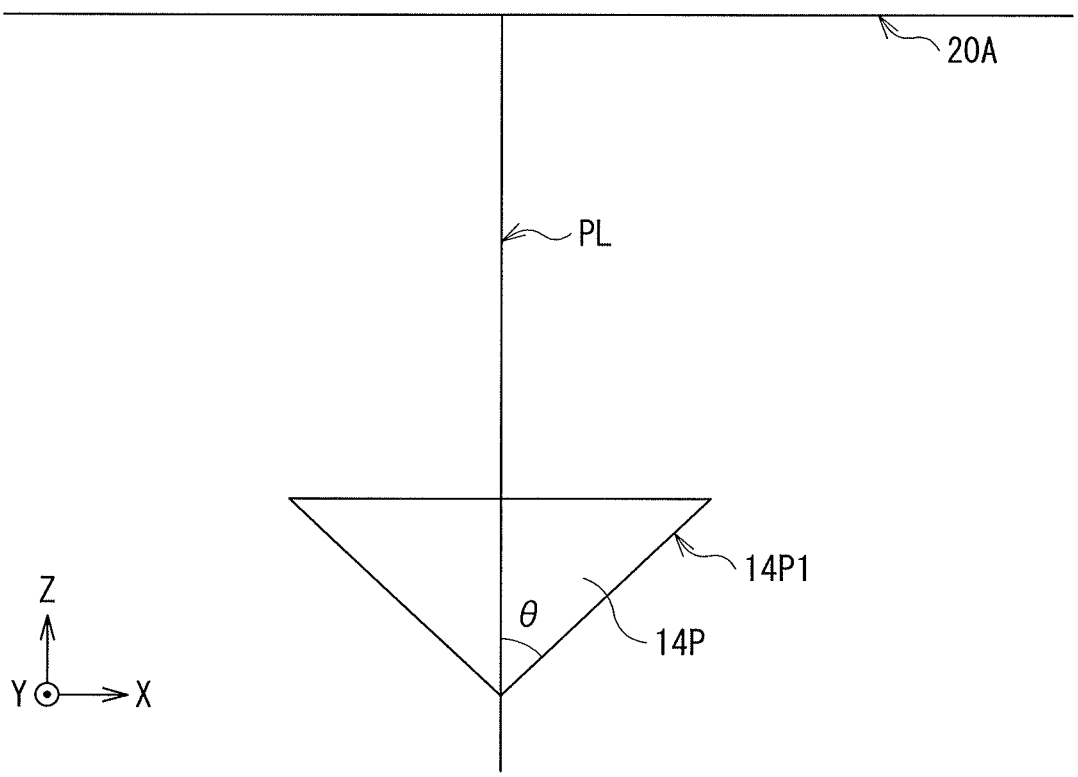

[ FIG. 4A ]
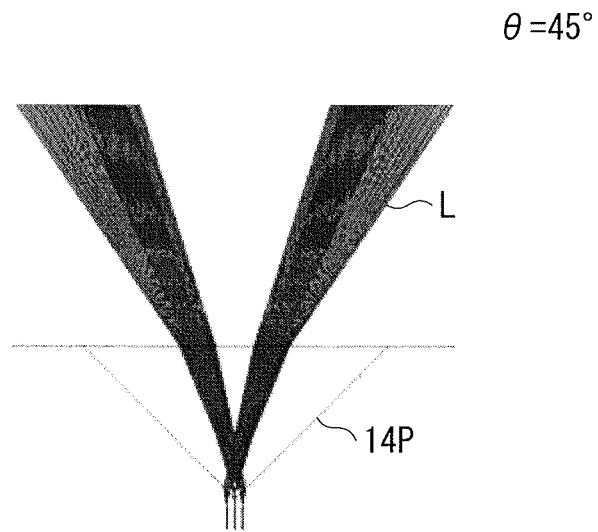
[ FIG. 4B ]
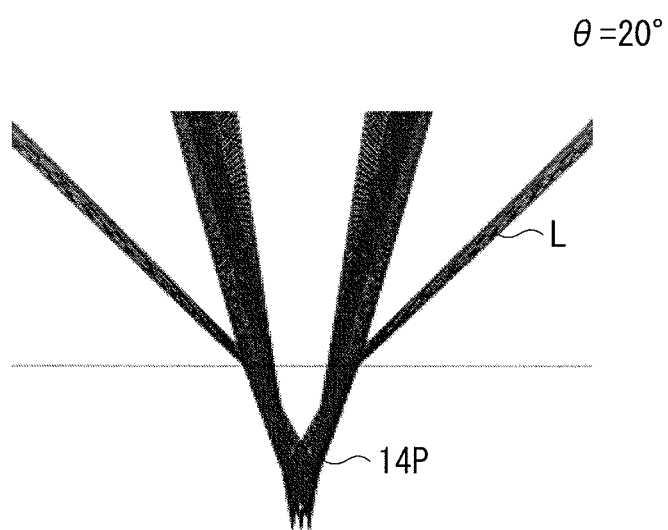

[ FIG. 5A ]
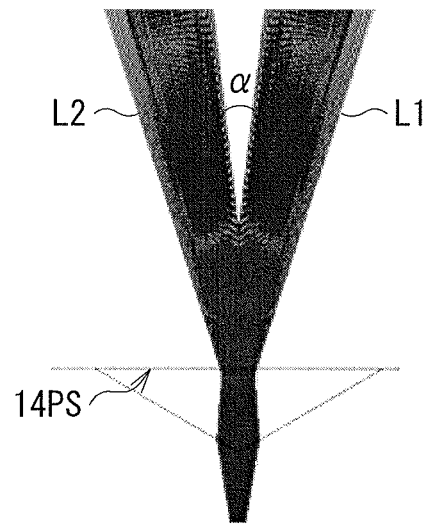
[ FIG. 5B ]
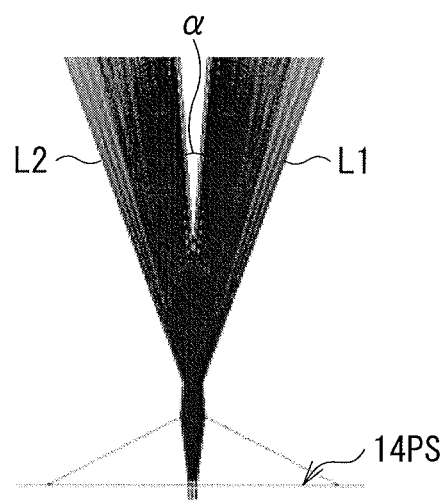

[ FIG. 6A ]
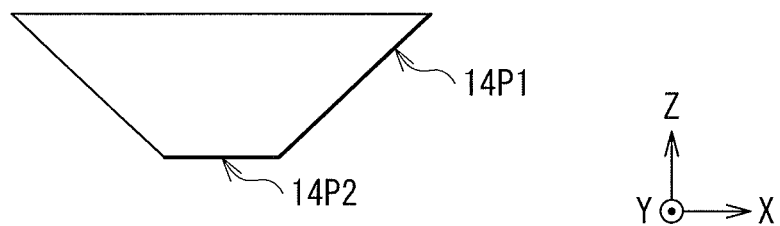
[ FIG. 6B ]
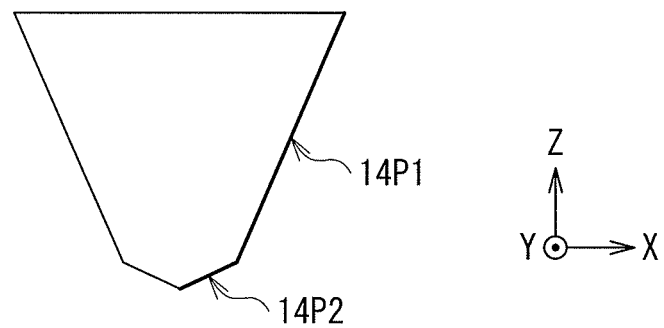
[ FIG. 6C ]
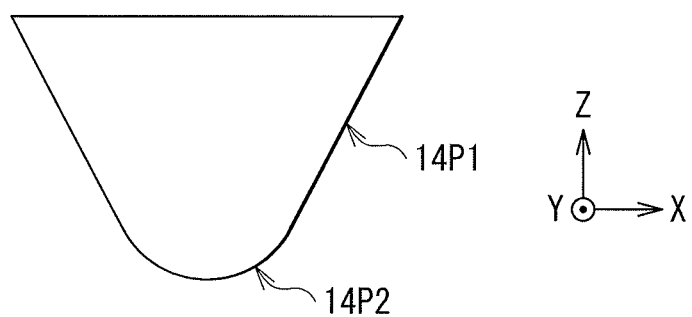

[ FIG. 7A ]
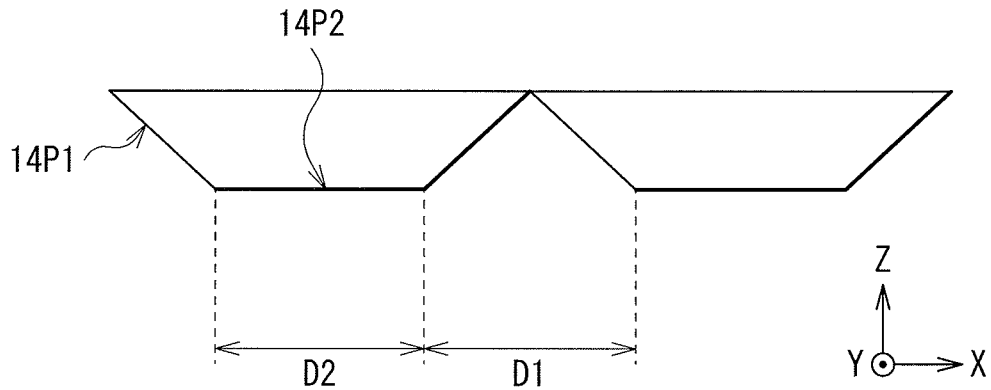
[ FIG. 7B ]
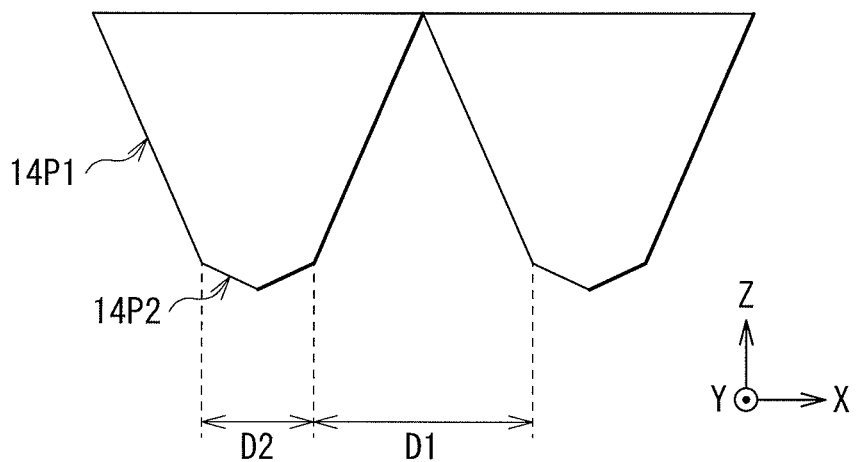
[ FIG. 7C ]
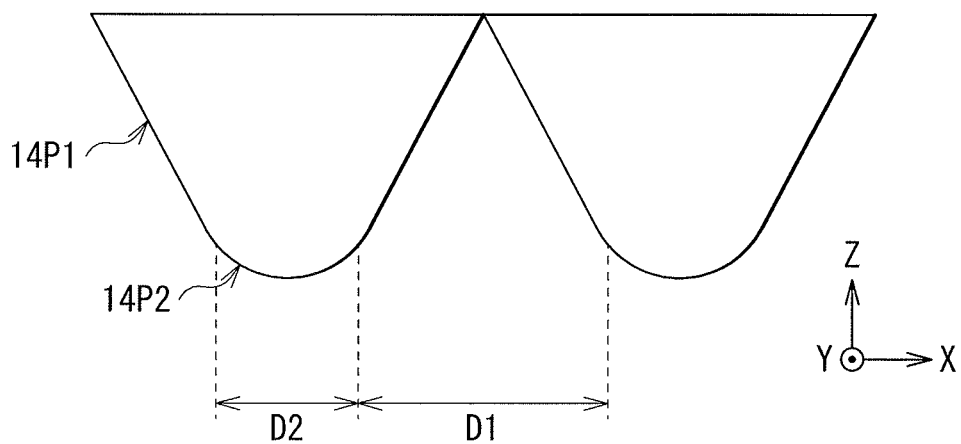

[ FIG. 8 ]
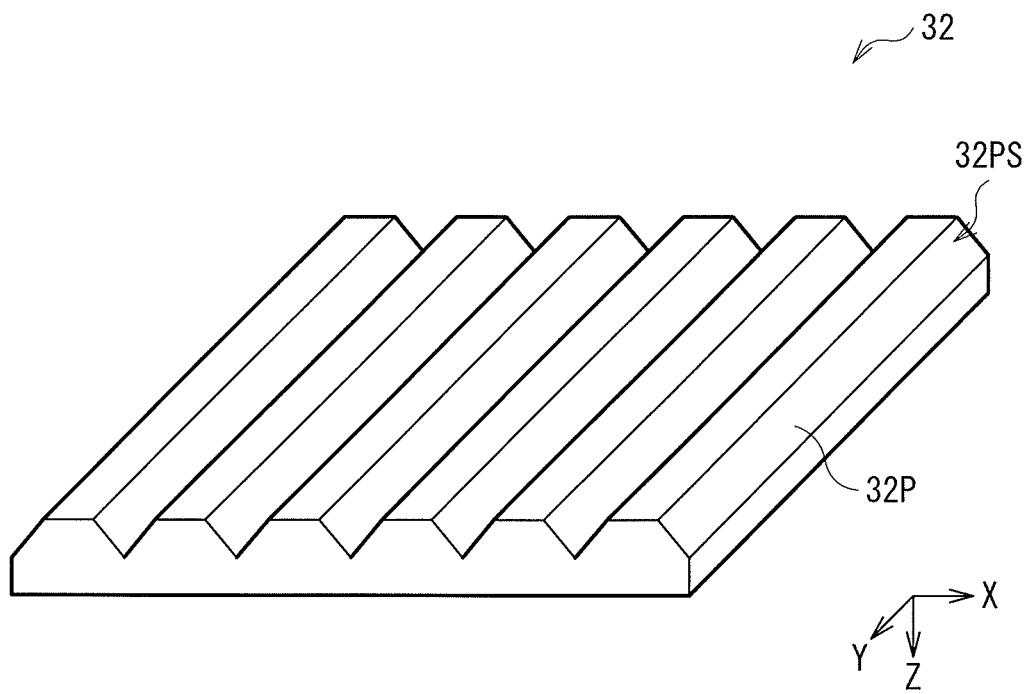
[ FIG. 9 ]
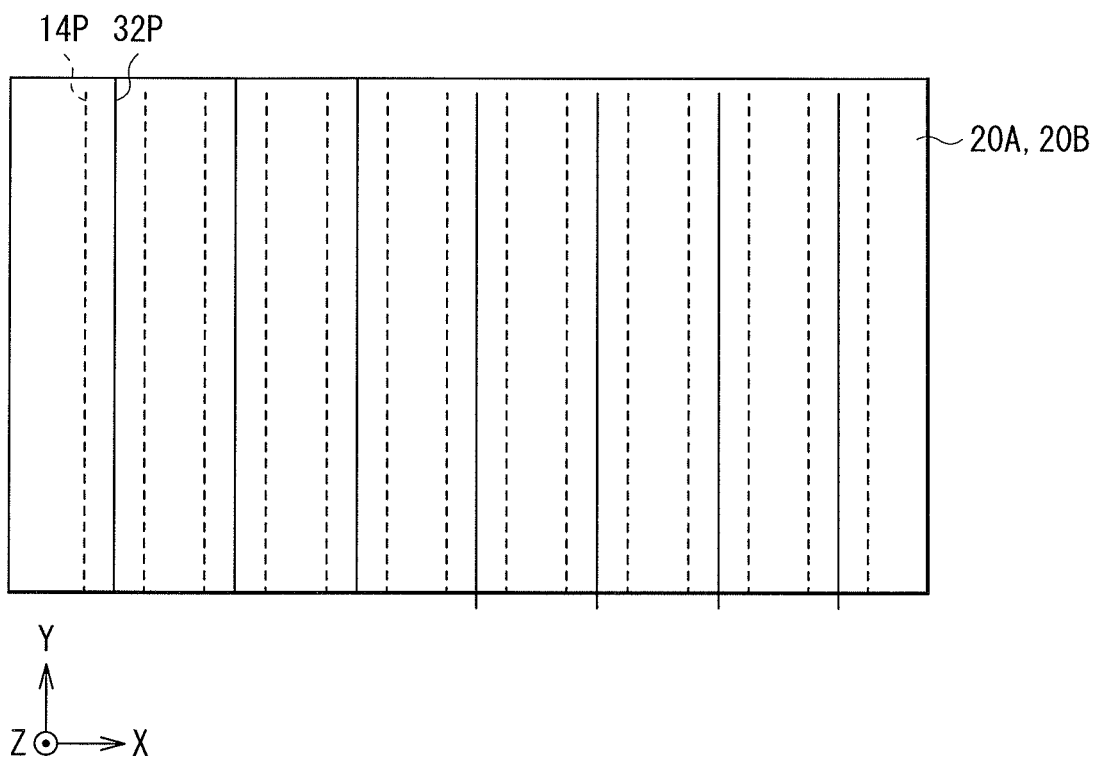

[FIG. 10]
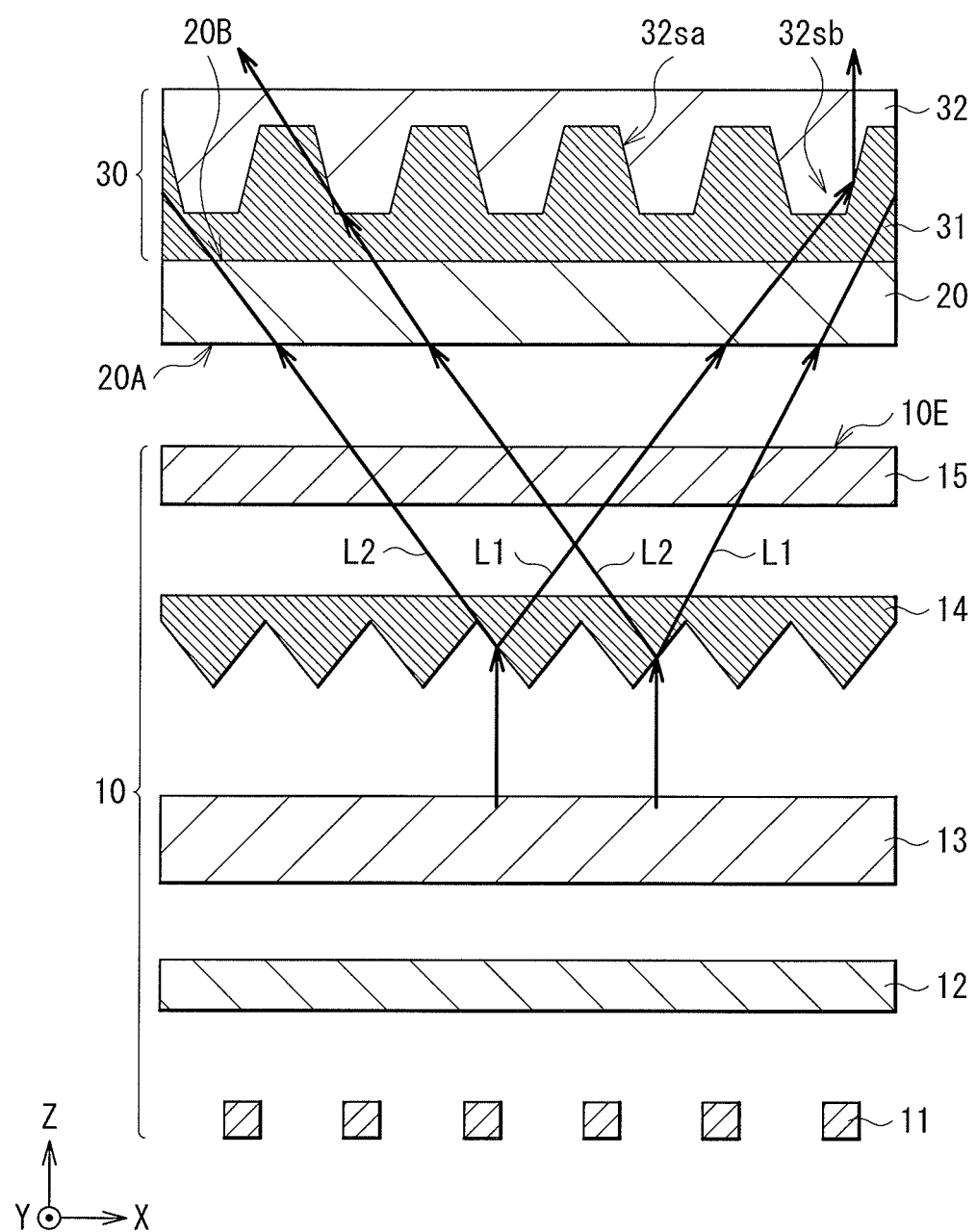

[ FIG. 11 ]
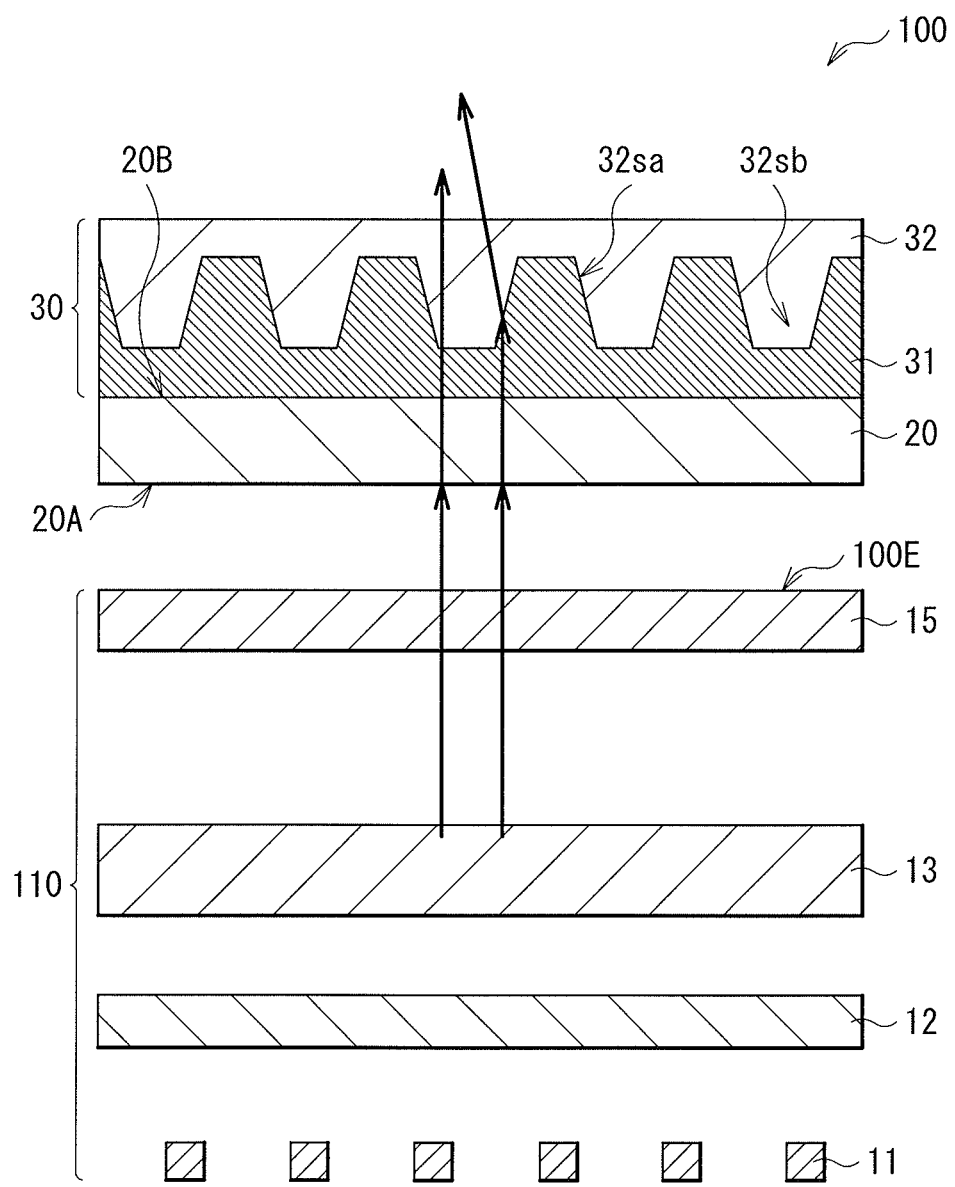

[ FIG. 12A ]
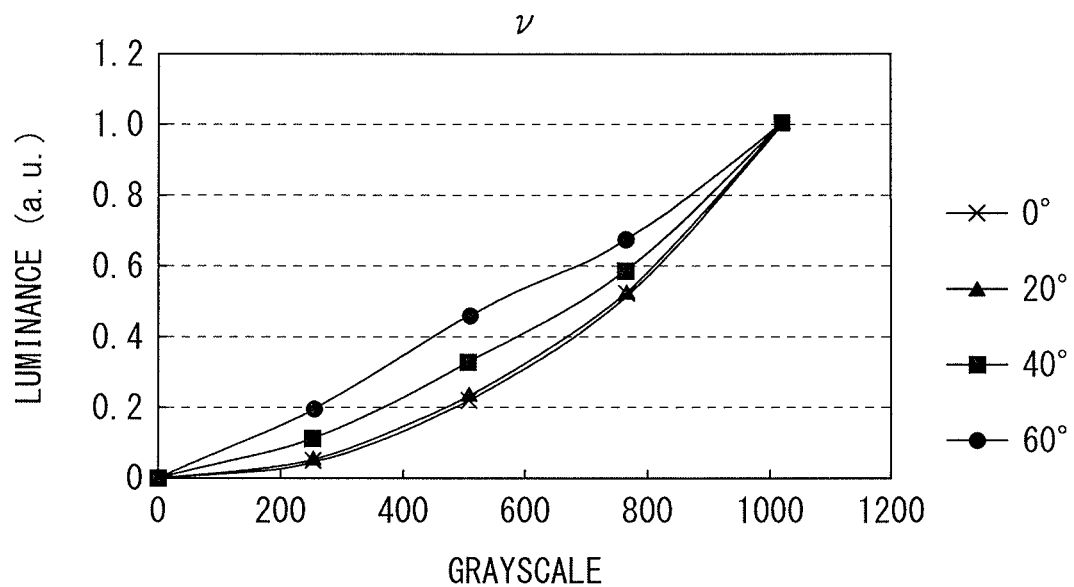
[ FIG. 12B ]
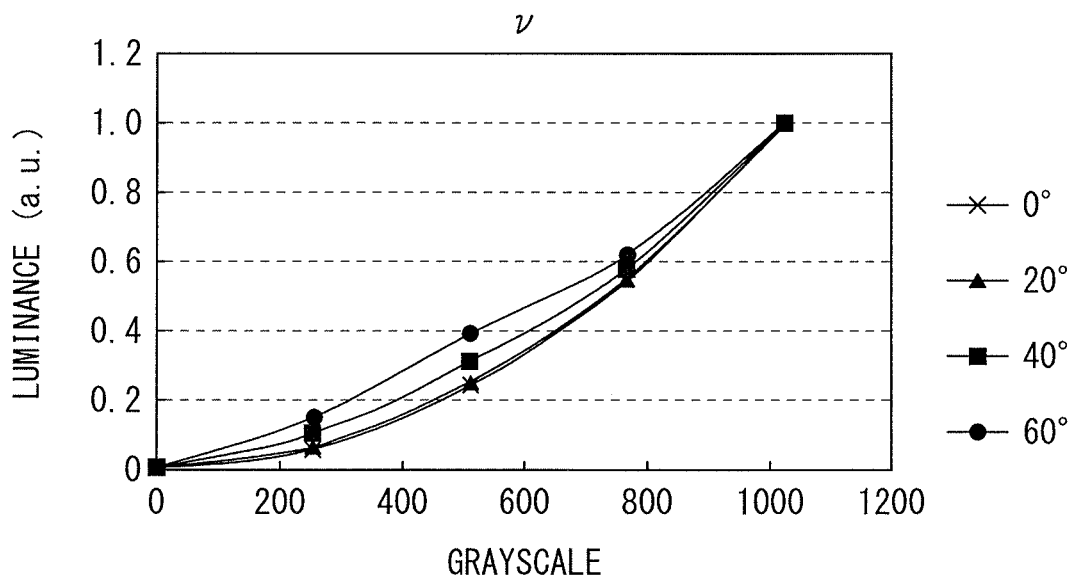

[ FIG. 13A ]
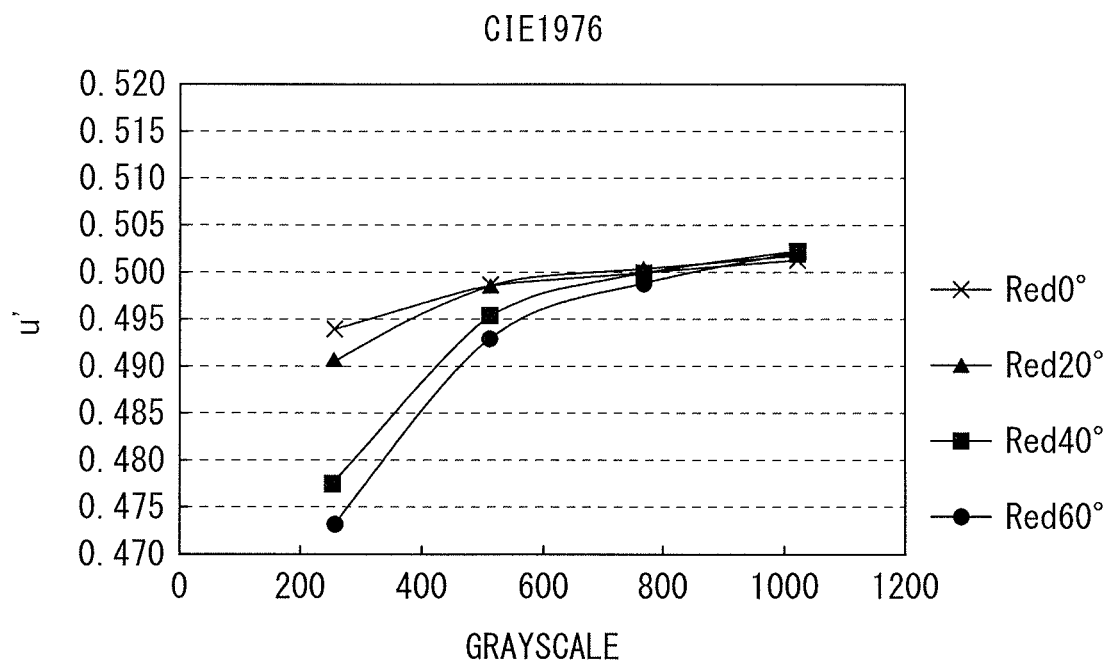
[ FIG. 13B ]
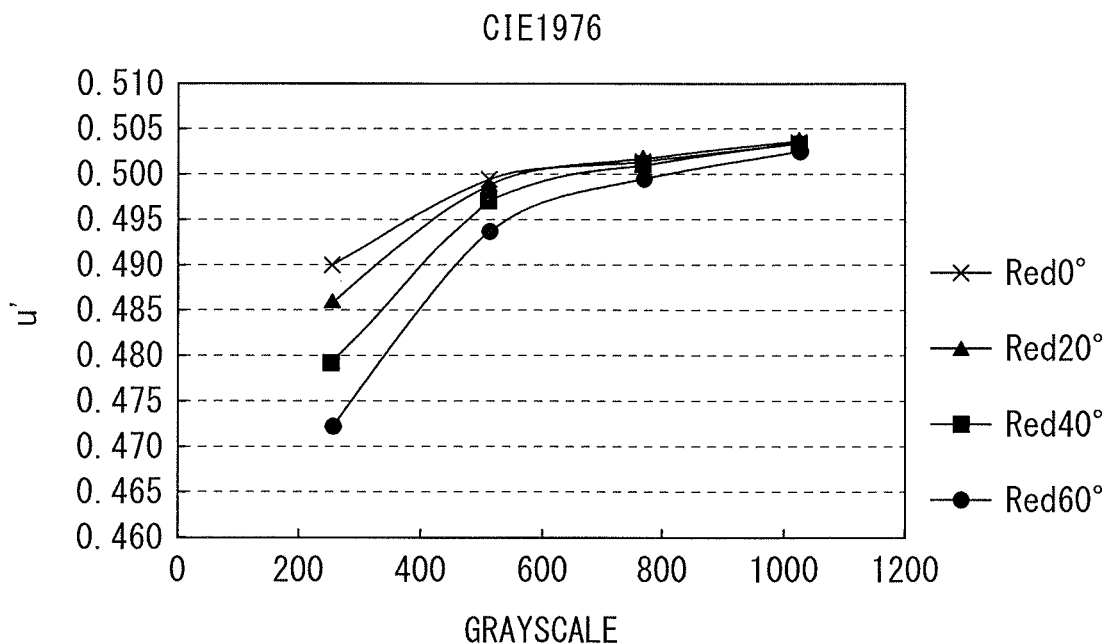

[ FIG. 14 ]
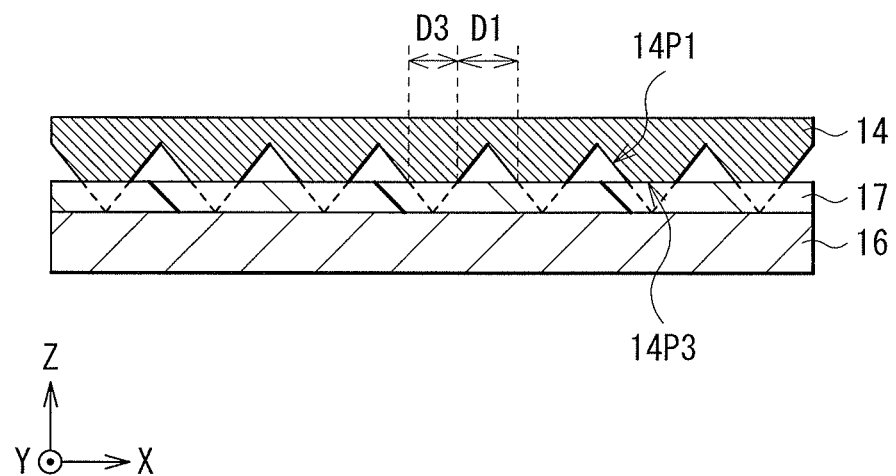

[ FIG. 15A ]
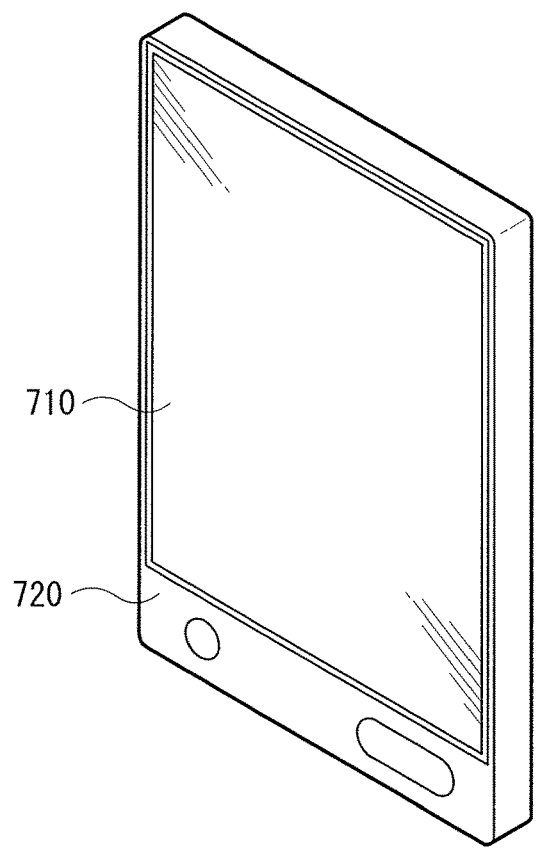
[ FIG. 15B ]
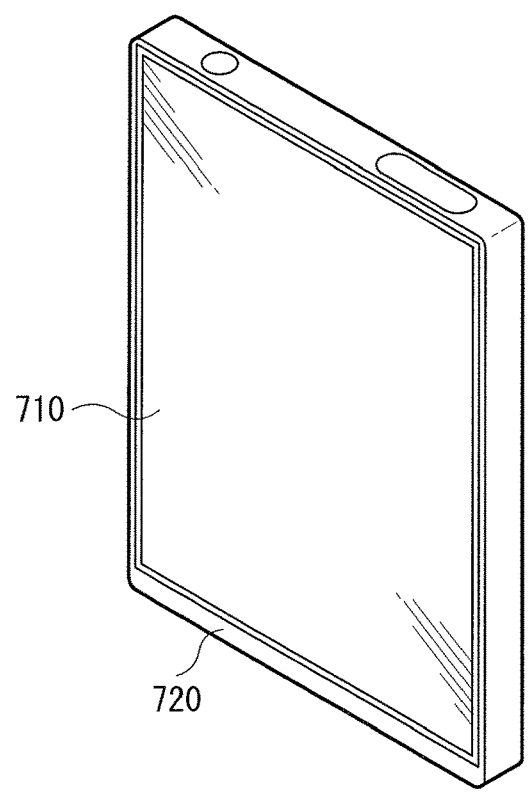

LIGHT EMITTING APPARATUS AND DISPLAY APPARATUS

CROSS-REFERENCE TO RELATED APPLICATIONS

This application is a national phase entry under 35 U.S.C. § 371 of International Application No. PCT/JP2018/026000 filed Jul. 10, 2018, which claims the priority from Japanese Patent Application No. 2017-170521 filed in the Japanese Patent Office on Sep. 5, 2017, the entire contents of which are hereby incorporated by reference herein.

TECHNICAL FIELD

The present technology relates to a light emitting apparatus and a display apparatus having, for example, a light emitting section for allowing light to enter a liquid crystal layer.

BACKGROUND ART

A liquid crystal display apparatus has a liquid crystal panel and a backlight, in which light emitted from the backlight enters the liquid crystal panel. The backlight outputs light with high directivity (see, for example, PTL 1).

CITATION LIST

Patent Literature

PTL 1: Japanese Unexamined Patent Application Publication No. 2009-300508

SUMMARY OF THE INVENTION

It is desired for a light emitting apparatus applied to such a liquid crystal display apparatus to improve view angle characteristics.

It is therefore desirable to provide a light emitting apparatus and a display apparatus that make it possible to improve view angle characteristics.

A light emitting apparatus according to an embodiment of the present technology includes: a liquid crystal section having a liquid crystal layer between a first surface and a second surface that face each other; a light emitting section that has a light output surface and outputs light from the light output surface with respect to the first surface in an oblique direction, in which the light output surface faces the first surface of the liquid crystal section; and an optical component facing the second surface of the liquid crystal section and having an interface, in which the interface is inclined with respect to the second surface and has different refractive indices.

A display apparatus according to an embodiment of the present technology includes: a liquid crystal panel having a liquid crystal layer between a first surface and a second surface that face each other; a light emitting section that has a light output surface and outputs light from the light output surface with respect to the first surface in an oblique direction, in which the light output surface faces the first surface of the liquid crystal panel; and an optical component facing the second surface of the liquid crystal panel and having an interface, in which the interface is inclined with respect to the second surface and has different refractive indices.

In the light emitting apparatus or the display apparatus according to an embodiment of the present technology, the light entered from the light output surface of the light emitting section in the oblique direction with respect to the first surface of the liquid crystal section passes through the liquid crystal layer. The light having passed through the liquid crystal layer is refracted (passes through) and reflected at the interface of the optical component to be extracted.

In the light emitting apparatus and the display apparatus according to an embodiment of the present technology, the light emitting section emits the light with respect to the first surface of the liquid crystal section in the oblique direction. This reduces a difference between optical characteristics of the light extracted in a perpendicular direction (a front direction) with respect to the second surface and optical characteristics of the light extracted in the direction inclined from the second surface, compared to a case where the light emitting section outputs light in a perpendicular direction with respect to the first surface of the liquid crystal section. It is thus possible to improve view angle characteristics. It is to be noted that the effects described here are not necessarily limiting, and there may be any of effects set forth in the present disclosure.

BRIEF DESCRIPTION OF THE DRAWING

FIG. 1 is a schematic cross-sectional view of an overall configuration of a display apparatus according to one embodiment of the present technology.

FIG. 2 is a perspective view of a schematic configuration of a first prism sheet illustrated in FIG. 1.

FIG. 3 is a diagram illustrating a surface that configures a projection on the first prism sheet illustrated in FIG. 2.

FIG. 4A is a diagram illustrating a light flux where an angle θ illustrated in FIG. 2 is 45 degrees.

FIG. 4B is a diagram illustrating a light flux where the angle θ illustrated in FIG. 2 is 20 degrees.

FIG. 5A is a diagram illustrating a light flux where the prism surface illustrated in FIG. 2 is disposed on side of a light source.

FIG. 5B is a diagram illustrating a light flux where the prism surface illustrated in FIG. 2 is disposed on an opposite side from the light source.

FIG. 6A is a schematic cross-sectional view of another example (1) of a shape of the projection illustrated in FIG. 2.

FIG. 6B is a schematic cross-sectional view of another example (2) of the shape of the projection illustrated in FIG. 2.

FIG. 6C is a schematic cross-sectional view of another example (3) of the shape of the projection illustrated in FIG. 2.

FIG. 7A is a diagram illustrating sizes of a plurality of surfaces that configure the projection illustrated in FIG. 6A.

FIG. 7B is a diagram illustrating sizes of a plurality of surfaces that configure the projection illustrated in FIG. 6B.

FIG. 7C is a diagram illustrating sizes of a plurality of surfaces that configure the projection illustrated in FIG. 6C.

FIG. 8 is a perspective view of a schematic configuration of a second prism sheet illustrated in FIG. 1.

FIG. 9 is a schematic plan view illustrating an extending direction of the projection on the second prism sheet illustrated in FIG. 8.

FIG. 10 is a diagram illustrating an operation of the display apparatus illustrated in FIG. 1.

FIG. 11 is a schematic cross-sectional view of a configuration of a main part of a display apparatus according to a comparison example.

FIG. 12A is a diagram illustrating a change in optical characteristics depending on an angle of viewing the display apparatus illustrated in FIG. 11.

FIG. 12B is a diagram illustrating a change in optical characteristics depending on an angle of viewing the display apparatus illustrated in FIG. 1.

FIG. 13A is a diagram illustrating a change in color depending on an angle of viewing the display apparatus illustrated in FIG. 11.

FIG. 13B is a diagram illustrating a change in color depending on an angle of viewing the display apparatus illustrated in FIG. 1.

FIG. 14 is a schematic cross-sectional view of a configuration of a first prism sheet according to a modification example.

FIG. 15A is a perspective view of an appearance of an electronic device to which the display apparatus illustrated in FIG. 1 is applied.

FIG. 15B is a perspective view of another example of the electronic device illustrated in FIG. 15A.

MODES FOR CARRYING OUT THE INVENTION

In the following, embodiments of the present technology are described in detail with reference to the drawings. It is to be noted that the description is made in the following order.
1. Embodiment (A display apparatus having a light emitting section that outputs light in an oblique direction with respect to a liquid crystal panel)
2. Modification Example (An example in which a first prism sheet is bonded to an optical sheet)

1. Embodiment (Configuration of Display Apparatus 1)

FIG. 1 is a cross-sectional diagram that schematically illustrates a configuration of a main part of a liquid crystal display apparatus (a display apparatus 1) according to an embodiment of the present technology. The display apparatus 1 has a light emitting section (a light emitting section 10) that functions as a backlight, a liquid crystal panel 20 illuminated by light outputted from a light output surface (a light output surface 10E) of the light emitting section 10, and an optical member 30 provided on a surface (a second surface 20B) on a light extraction side of the liquid crystal panel 20. The liquid crystal panel 20 has a first surface 20A that the light outputted from the light emitting section 10 enters and the second surface 20B that faces the first surface 20A. The light emitting section 10 is provided on a back surface side (side of the first surface 20A) of the liquid crystal panel 20. Here, the liquid crystal panel 20 is a specific example of a "liquid crystal section" according to the present technology.

The light emitting section 10 is, for example, a direct backlight, and has a light source 11, a diffusion plate 12, a collimation section 13, a first prism sheet 14, and a reflective polarizing film 15 in order from the back surface side (side farther from the light output surface 10E). The light output surface 10E of the light emitting section 10 is disposed to face the first surface 20A of the liquid crystal panel 20.

The light emitting section 10 is provided with a plurality of light sources 11 that faces the diffusion plate 12. The light source 11 includes, for example, LED (Light Emitting Diode). The light source 11 has, for example, a laminated structure including an n-type cladding layer, an active layer, and a p-type cladding layer. The light source 11 also has an n-side electrode electrically coupled to the n-type cladding layer and a p-side electrode electrically coupled to the p-type cladding layer. All of the light sources 11 may output light of the same color. Alternatively, the light emitting section 10 may be provided with the light sources 11 that output light of different colors.

The light sources 11 are provided on, for example, a light source substrate (not illustrated). The light source substrate is provided with a wiring line pattern to allow for a light emission control for each drive unit region. The wiring line pattern supplies a drive current to the light sources 11. This enables local light emission control (local dimming) of the plurality of light sources 11.

The diffusion plate 12 is disposed between the light sources 11 and the collimation section 13. The diffusion plate 12 is configured to receive light outputted from the light sources 11. The light entered the diffusion plate 12 is diffused inside the diffusion plate 12, thereby uniformizing luminance, etc., within the plane. The uniformized light enters the first surface 20A of the liquid crystal panel 20 via the collimation section 13. The diffusion plate 12 includes, for example, a resin material such as an acrylic resin or a polycarbonate resin.

The collimation section 13 provided between the diffusion plate 12 and the first prism sheet 14 collimates the light uniformized by the diffusion plate 12. That is, the collimation section 13 outputs light with high directivity in a perpendicular direction with respect to the first surface 20A of the liquid crystal panel 20. The collimation section 13 includes, for example, two prism sheets (not illustrated) having projections extending in directions orthogonal to each other (an X direction and a Y direction in FIG. 1).

The first prism sheet 14 (a first optical sheet) is provided between the collimation section 13 and the reflective polarizing film 15, and splits parallel light entering from the collimation section 13 into light fluxes in two directions, for example. The first prism sheet 14 is disposed with respect to each of the collimation section 13 and the reflective polarizing film 15 through an air layer. In the present embodiment, the first prism sheet 14 is provided between the collimation section 13 and the light output surface 10E, allowing light to be outputted from the light output surface 10E of the light emitting section 10 with respect to the first surface 20A of the liquid crystal panel 20 in an oblique direction. Although details will be described later, this makes it possible to improve view angle characteristics.

FIG. 2 is a perspective view of a schematic configuration of the first prism sheet 14. The first prism sheet 14 has a prism surface 14PS provided with a plurality of belt-like projections 14P. The plurality of projections 14P extends in the same direction (the Y direction in FIG. 2), and, on the prism surface 14PS, the plurality of projections 14P is arranged in a direction (the X direction in FIG. 2) intersecting a predetermined direction. A cross-sectional shape of the projection 14P is, for example, triangular.

The projection 14P has a surface (a surface 14P1) inclined at an angle $\theta$ with respect to a perpendicular line PL to the first surface 20A of the liquid crystal panel 20, as illustrated in FIG. 3, and the angle $\theta$ desirably satisfies the following Expression (1).

$$\theta \gtrsim 90 - \sin^{-1}(n0/n1 \times \sin(90-\theta)) \quad (1)$$

n0 . . . Refractive index of substance in contact with prism surface 14PS n1 . . . Refractive index of projection 14P

For example, the substance in contact with the prism surface 14PS is air, which satisfies n0=1. Moreover, the projection 14P includes a transparent (light transmissive) resin material, which satisfies n1=1.4 to 1.8. Applying the n0=1 and the n1=1.4 to 1.8 to Expression (1), it satisfies the angle θ≥25 degrees. That is, the projection 14P desirably has the surface 14P1 that makes the angle θ equal to or larger than 25 degrees with respect to the perpendicular line PL.

FIGS. 4A and 4B illustrate a light flux (a light flux L) that passes through the projection 14P. FIG. 4A illustrates the projection 14P having the angle θ of 45 degrees, and FIG. 4B illustrates the projection 14P having the angle θ of 20 degrees. In this manner, when the angle θ is less than 25 degrees (when Expression (1) is not satisfied), the light flux that passes through the projection 14P tends to be split into three or more directions (FIG. 4B). The light flux L split into three or more directions makes it difficult to improve the view angle characteristics. Accordingly, it is desirable that the angle θ satisfy the above-described Expression (1).

The first prism sheet 14 is preferably disposed with its prism surface 14PS facing toward the light sources 11. That is, the prism surface 14PS is disposed to face the light sources 11 (the collimation section 13) and a flat surface opposite to the prism surface 14PS is disposed to face the liquid crystal panel 20 (the reflective polarizing film 15).

FIGS. 5A and 5B illustrate the light fluxes (light fluxes L1 and L2) passing through the first prism sheet 14. In FIG. 5A, the prism surface 14PS is disposed to face the light sources 11, and in FIG. 5B, the prism surface 14PS is disposed to face the liquid crystal panel 20. Providing the prism surface 14PS to face the light sources 11 makes it possible to further increase an angle α formed by the light fluxes L1 and L2 split in two directions. Moreover, it is difficult for the light fluxes L1 and L2 to diffuse. This makes it possible to further improve the view angle characteristics.

FIGS. 6A to 6C illustrate examples of cross-sectional shape of the projection 14P. The cross-sectional shape of the projection 14P may be trapezoidal (FIG. 6A). The trapezoidal cross-sectional shape is, for example, a shape of a triangle with one of its corners cut away. By making the cross-sectional shape of the projection 14P trapezoidal, there is provided, in addition to the surface 14P1 forming the angle θ with respect to the perpendicular line PL, a surface (a surface 14P2) closer to perpendicular with respect to the perpendicular line PL (parallel to the first surface 20A). The surface 14P2 is disposed perpendicular to the perpendicular line PL, for example. In this manner, by providing the projection 14P with the surface 14P2 inclined at an angle different from that of the surface 14P1, it is possible to improve design freedom. For example, by providing the surface 14P2 closer to perpendicular with respect to the perpendicular line PL than the surface 14P1, it is possible to suppress reduction in front luminance by the surface 14P2 while improving the view angle characteristics by the surface 14P1.

As illustrated in FIG. 6B, the cross-sectional shape of the projection 14P may be pentagonal to have the surfaces 14P1 and 14P2, or the surface 14P2 may have a curved surface as illustrated in FIG. 6C.

By providing the projection 14P with the surfaces 14P1 and 14P2, as illustrated in FIGS. 7A to 7C, it is possible to adjust a distance D1 (a distance between adjacent surfaces 14P1 in the X direction) of the surface 14P1 between the adjacent projections 14P and a distance D2 (a size of the surface 14P2 in the X direction) of the surface 14P2. This makes it possible to further improve the design freedom. D1:D2 is, for example, 42:58.

Provided between the first prism sheet 14 and the first surface 20A of the liquid crystal panel 20 is, for example, the reflective polarizing film 15. The reflective polarizing film 15 is a luminance increasing member that increases and outputs only a specific polarization component, which member transmits one polarization component among incident light and reflects the other polarization component. By converting the other reflected polarization component into the one polarization component, it is possible to improve utilization efficiency of light. As the reflective polarizing film 15, for example, a DBEF (Dual Brightness Enhancement Film) may be used.

The liquid crystal panel 20 is a transmissive liquid crystal panel that displays a moving image or a still image. The liquid crystal panel 20 has the first surface 20A disposed to face the reflective polarizing film 15 and to be close to the reflective polarizing film 15, and the second surface 20B that is farther from the reflective polarizing film 15 than the first surface 20A. The shapes of the first surface 20A and the second surface 20B is, for example, rectangular (see FIG. 9 to be described later). The liquid crystal panel 20 has, for example, a pair of substrates and a liquid crystal layer provided between the pair of substrates. The liquid crystal panel 20 may be further provided with a polarizing plate or the like. For example, light outputted from the light emitting section 10 enters one substrate from the first surface 20A, and it is extracted from the second surface 20B via the liquid crystal layer and the other substrate. The liquid crystal panel 20 is driven in a VA (Vertical Alignment) method, for example. The liquid crystal panel 20 may be driven in an IPS (In-Plane-Switching) method or in a TN (Twisted Nematic) method.

The optical member 30 disposed to face the second surface 20B of the liquid crystal panel 20 has, for example, an adhesive layer 31 (a first adhesive layer) and a second prism sheet 32 (a second optical sheet). The second prism sheet 32 is bonded to the second surface 20B of the liquid crystal panel 20 by the adhesive layer 31. The optical member 30 allows the direction of the light flux having passed through the liquid crystal panel 20 to be changed in the perpendicular direction (a front direction) with respect to the second surface 20B.

The adhesive layer 31 is provided between a prism surface (a prism surface 32PS in FIG. 8 to be described later) of the second prism sheet 32 and the second surface 20B of the liquid crystal panel 20 to fill a gap therebetween. The adhesive layer 31 has a refractive index different from the refractive index of the second prism sheet 32 (more specifically, a projection 32P in FIG. 8 to be described later). Therefore, the optical member 30 has interfaces (interfaces 32sa and 32sb) with different refractive indices on a contact surface between the adhesive layer 31 and the second prism sheet 32. The adhesive layer 31 includes, for example, a resin material such as acrylic or epoxy, and the refractive index of the adhesive layer 31 is, for example, 1.4 to 1.8.

FIG. 8 is a perspective view that schematically illustrates a configuration of the second prism sheet 32. The second prism sheet 32 has the prism surface 32PS provided with a plurality of belt-like projections 32P. The projections 32P extend, for example, in a predetermined direction (the Y direction in FIG. 8), and the plurality of projections 32P are arranged on the prism surface 32PS in a direction (the X direction in FIG. 8) intersecting the predetermined direction. The cross-sectional shape of the projection 32P is, for example, trapezoidal.

FIG. 9 illustrates the extending direction of the projections 32P together with the extending direction of the projections 14P on the first prism sheet 14. The projections 32P preferably extend in parallel with or substantially in parallel with the projections 14P on the first prism sheet 14. The extending direction of the projections 32P is, for example, no less than 0 degree and no more than 45 degrees with respect to the extending direction of the projections 14P.

The extending direction of the projections 14P and 32P is preferably parallel to short sides of the rectangular first surface 20A and second surface 20B. That is, the projections 14P and 32P extend along the direction (the Y direction in FIG. 9) of the short sides of the rectangular first surface 20A and second surface 20B, and the plurality of projections 14P and 32P are arranged along the direction (the X direction in FIG. 9) of long sides thereof. By providing the projections 14P and 32P in this manner, image quality is retained in a case where an angle of viewing offsets in the direction of the long side from the front of the second surface 20B. The cross-sectional shape of the projection 32P may be triangular or pentagonal (see FIG. 6B), or a portion of the projection 21P may have a curved surface (see FIG. 6C). The projection 32P includes, for example, a transparent resin material, and the refractive index of the projection 32P is 1.4 to 1.8.

The second prism sheet 32 is preferably disposed with its prism surface 32PS provided with such projections 32P facing toward the liquid crystal panel 20 (the second surface 20B). That is, the prism surface 32PS is disposed to face the liquid crystal panel 20 and the adhesive layer 31 is disposed between the prism surface 32PS and the second surface 20B of the liquid crystal panel 20. The prism surface 32PS of the second prism sheet 32 may be disposed facing away from the liquid crystal panel 20 toward the opposite side.

The prism surface 32PS of the second prism sheet 32 is provided with the interfaces 32*sa* and 32*sb* with different refractive indices between itself and the adhesive layer 31 (FIG. 1). The interfaces 32*sa* and 32*sb* are disposed between the projection 32P and the adhesive layer 31. Disposed between the projection 32P having a trapezoidal cross-sectional shape and the adhesive layer 31 are the interface 32*sa* inclined with respect to the second surface 20B of the liquid crystal panel 20 and the interface 32*sb* parallel to the second surface 20B. The interface 32*sa* is preferably inclined by 65 degrees to 88 degrees with respect to the second surface 20B of the liquid crystal panel 20. It is sufficient for the interface 32*sb* to have a smaller inclination angle with respect to the second surface 20B than that of the interface 32*sa*. By providing the optical member 30 with the interfaces 32*sa* and 32*sb* having different inclination angles with respect to the second surface 20B of the liquid crystal panel 20 in this manner, it is possible to improve design freedom. It is sufficient for the optical member 30 to be provided with at least the interface 32*sa*.

The display apparatus 1 may be provided with a reflective sheet, a phase difference film, a polarizing film, a wavelength conversion sheet, or the like.

(Operation of Display Apparatus 1)

An operation of the display apparatus 1 is described with reference to FIG. 10. In the display apparatus 1, light generated in the light source 11 is, for example, reflected by the reflective sheet (not illustrated) and enters the diffusion plate 12. In the diffusion plate 12, the entered light is diffused uniformly. The light diffused in the diffusion plate 12 enters the collimation section 13 to be made into parallel light in the perpendicular direction with respect to the first surface 20A of the liquid crystal panel 20. The parallel light enters the prism surface 14PS of the first prism sheet 14 to be split mainly into the light fluxes L1 and L2 in two directions. The light fluxes L1 and L2 enters the first surface 20A of the liquid crystal panel 20 in the oblique direction via the reflective polarizing film 15 and passes through the liquid crystal panel 20. The light fluxes L1 and L2 extracted from the second surface 20B of the liquid crystal panel 20 are refracted (passes through) and reflected at the interfaces 32*sa* and 32*sb* of the optical member 30 to be extracted mainly in the perpendicular direction (the front direction) with respect to the first surface 20A of the liquid crystal panel 20.

(Workings and Effects of Display Apparatus 1)

In the display apparatus 1, because the light emitting section 10 is provided with the first prism sheet 14, the light fluxes L1 and L2 enter from the light emitting section 10 with respect to the first surface 20A of the liquid crystal panel 20 in the oblique direction. The light fluxes L1 and L2 pass through the liquid crystal layer of the liquid crystal panel 20 while maintaining its traveling direction. This makes it possible to reduce a difference between optical characteristics of the light extracted in the perpendicular direction (front direction) with respect to the second surface 20B and the optical characteristics of the light extracted in the direction inclined from the second surface 20B, thereby improving the view angle characteristics. This is described in the following.

FIG. 11 illustrates a schematic cross-sectional configuration of a main part of a display apparatus (display apparatus 100) according to a comparison example. A light emitting section (light emitting section 110) of the display apparatus 100 is not provided with the first prism sheet (the first prism sheet 14 in FIG. 1). In the display apparatus 100, light outputted from the light source 11 is made into parallel light through the collimation section 13, and enters from a light output surface (a light output surface 100E) of the light emitting section 110 in the perpendicular direction with respect to the first surface 20A of the liquid crystal panel 20. The light passes through the liquid crystal layer of the liquid crystal panel 20 while maintaining its traveling direction and enters the optical member 30 through the second surface 20B.

In such a display apparatus 100, the light in the perpendicular direction with respect to the second surface 20B of the liquid crystal panel 20 enters the optical member 30. The light is refracted at the interface 32*sa* of the optical member 30, and a refractive angle thereof depends on a difference between its refractive index and that of the interface 32*sa*. Both the adhesive layer 31 and the projection 32P include a resin material, which makes it difficult to increase the difference in refractive index. Therefore, the traveling direction of the light outputted from the optical member 30 is mainly the perpendicular direction with respect to the second surface 20B; although a portion of the light is outputted in directions offset from the perpendicular direction, an angular difference between these directions is small. That is, because an angular range for synthesizing (mixing) light extracted as display light is narrow, the difference between the optical characteristics of the light extracted in the front direction and the optical characteristics of the light extracted in the direction offset from the front direction increases.

Moreover, in the display apparatus 100, the light in the perpendicular direction with respect to the first surface 20A and the second surface 20B passes through the liquid crystal layer. Therefore, although a visual image is balanced when viewed in the front direction, there is a possibility that the visual image may be severely unbalanced when viewed in the direction offset from the front direction. Especially with the liquid crystal panel 20 driven in the VA method, the image quality is degraded due to an angle of viewing.

In this manner, with the display apparatus 100, in a case of viewing the visual image in the direction offset from the front, the image quality may possibly be severely degraded compared to a case of viewing the visual image in the front direction. For example, with a color visual image, colors of the image vary severely depending on the viewing direction.

To the contrary, in the case of the display apparatus 1, the light fluxes L1 and L2 enter from the light emitting section 10 in the oblique direction with respect to the first surface 20A of the liquid crystal panel 20 and reach the interfaces 32sa and 32sb of the optical member 30 while maintaining the direction. Accordingly, the traveling direction of the light refracted (passed through) and reflected at the interfaces 32sa and 32sb encompasses a wider angular range. That is, the angular range of synthesis of light extracted as the display light is wider than that in the case of the display apparatus 100, allowing for sufficient synthesis of light.

Moreover, in the display apparatus 1, the light in the oblique direction with respect to the first surface 20A and the second surface 20B passes through the liquid crystal layer. Accordingly, the difference between the optical characteristics of the light extracted in the front direction and the optical characteristics of the light extracted in the direction offset from the front is reduced compared to the case of the display apparatus 100. This reduces color variation due to the viewing direction even in the case of the color display image.

FIGS. 12A and 12B respectively illustrate changes in the optical characteristics of the display apparatus 100 and the display apparatus 1 depending on an angle of viewing. Horizontal axes in FIGS. 12A and 12B indicate grayscale and vertical axes indicate luminance (a.u.). In the display apparatus 100, the optical characteristics of the light extracted in the direction (40° and 60°) offset from the front are dramatically different from the optical characteristics of the light extracted in the front direction(0°) (FIG. 12A). Especially at the lower grayscale, the difference in the optical characteristics is larger. To the contrary, in the case of the display apparatus 1, even at the lower grayscale, the optical characteristics of the light extracted in the direction (40° and 60°) offset from the front are approximate to the optical characteristics of the light extracted in the front direction(0°) (FIG. 12B).

FIGS. 13A and 13B respectively illustrate color variations (CIE1976) of the display apparatus 100 and the display apparatus 1 depending on an angle of viewing. Horizontal axes in FIGS. 13A and 13B indicate grayscale and vertical axes indicate u'. In the display apparatus 100, the color of the light extracted in the direction (40° and) 60° offset from the front is dramatically different from the color of the light extracted in the front direction(0°) (FIG. 13A). Especially at the lower grayscale, the difference in the color is larger. To the contrary, in the case of the display apparatus 1, even at the lower grayscale, the color of the light extracted in the direction (40° and 60°) offset from the front becomes closer to the color of the light extracted in the front direction) (0°) (FIG. 13B).

In this manner, with the display apparatus 1, because the light fluxes L1 and L2 in the oblique direction with respect to the first surface 20A of the liquid crystal panel 20 enters the liquid crystal panel 20 owing to the light emitting section 10, the difference between the optical characteristics of the light extracted in the front direction (the perpendicular direction with respect to the second surface 20B of the liquid crystal panel 20) and the optical characteristics of the light extracted in the direction offset from the front direction is reduced compared to the case of the display apparatus 100. It is thus possible to improve the view angle characteristics.

Especially with the liquid crystal panel 20 driven in the VA method, it is possible to effectively improve the view angle characteristics.

Moreover, the light emitting section 10 is preferably configured to allow for local light emission control. By performing local dimming in conjunction with the visual image displayed on the liquid crystal panel 20, it is possible to suppress reduction in contrast.

As described above, in the display apparatus 1, the light emitting section 10 outputs the light fluxes L1 and L2 in the oblique direction with respect to the first surface 20A of the liquid crystal panel 20. This makes it possible to improve the view angle characteristics compared to the case where the light emitting section 10 outputs light in the perpendicular direction with respect to the first surface 20A of the liquid crystal panel 20 (the display apparatus 100). Because such a display apparatus 1 makes it possible to obtain higher view angle characteristics without losing utilization efficiency of light, the display apparatus 1 makes it possible to save energy.

While a modification example of the above-described embodiment is described below, components same as those of the above-described embodiment in the following description are denoted with the same reference numerals, and descriptions thereof are omitted where appropriate.

Modification Example

FIG. 14 schematically illustrates a cross-sectional configuration of the first prism sheet 14 according to a modification example of the above-described embodiment. Although the above-described embodiment is described with reference to the case where the projections 14P of the first prism sheet 14 are in contact with the air layer, the prism surface 14PS (the projections 14P) of the first prism sheet 14 may be bonded to another optical sheet (an optical sheet 16 or a third optical sheet) via an adhesive layer 17 (a second adhesive layer).

In this manner, by burying a portion of each projection 14P in the adhesive layer 17, there is provided an interface (a surface 14P3) between the projection 14P and the adhesive layer 17 in addition to the interface (the surface 14P1) between the projection 14P and the air layer. This makes it possible to improve the design freedom. The surface 14P3 functions in the same manner as the above-described surface 14P2.

Moreover, it is possible to adjust the distance D1 of the surface 14P1 between the adjacent projections 14P and a distance D3 (a size of the surface 14P3 in the X direction) of the surface 14P3. This makes it possible to further improve the design freedom. D1:D3 is, for example, 45:55.

Furthermore, it is also possible to increase strength by bonding a plurality of sheets (the first prism sheet 14 and the optical sheet 16) together. The optical sheet 16 may configure the collimation section 13 (FIG. 1).

Application Example: Electronic Device

In the following, an application example of the display apparatus 1 as described above to an electronic device is described. The electronic device includes, for example, a television apparatus, a medical monitor, a digital signage, a master monitor, a digital camera, a laptop personal computer, a portable terminal device such as a mobile phone, or a video camera. In other words, the above-described display apparatus 1 is applicable to an electronic device in various fields that displays a visual image signal inputted from the outside or the visual image signal generated inside as an image or a visual image.

FIGS. 15A and 15B each illustrate an appearance of a tablet terminal device to which the display apparatus 1 according to the above-described embodiment is applied. The tablet terminal device has, for example, a display section 710 and a non-display section 720, and the display section 710 includes the display apparatus 1 according to the above-described embodiment.

Although the present technology has been described above with reference to the embodiment and modification example, the present technology is not limited to the above-described embodiment and the like and may be modified in a variety of ways. For example, the disposed position and the shape of each section described in the above-described embodiment and the like are merely an example and not limiting.

Moreover, the dimension, the dimensional ratio, the shape, and the like of each component illustrated in each drawing are merely an example and the present technology is not limited thereto.

Furthermore, although the above-described embodiment and the like have been described taking an example in which the light emitting section 10 is of a direct type, the light emitting section 10 may be an edge-light-type light emitting section 10.

Moreover, although the above-described embodiment and the like have been described taking an example in which the light source 11 is an LED, the light source 11 may include a semiconductor laser or the like.

In addition, although the description has been made specifically with reference to a specific example configuration of the light emitting section 10, the display apparatus 1, and the like, not all the components may necessarily be included, and other components may be further included.

Moreover, materials and the like of each component described in the above-described embodiment are not limiting but other materials and the like may be used.

It is to be noted that the effects described herein are merely examples and not limiting, and there may be other effects.

The present technology may have the following configurations.

(1)
A light emitting apparatus including:
a liquid crystal section having a liquid crystal layer between a first surface and a second surface that face each other;
a light emitting section that has a light output surface and outputs light from the light output surface with respect to the first surface in an oblique direction, the light output surface facing the first surface of the liquid crystal section; and
an optical component facing the second surface of the liquid crystal section and having an interface, the interface being inclined with respect to the second surface and having different refractive indices.

(2)
The light emitting apparatus according to (1), in which the light emitting section includes:
a light source; and
a first optical sheet provided between the light source and the liquid crystal section and having a first prism surface.

(3)
The light emitting apparatus according to (2), in which the first prism surface of the first optical sheet is disposed to face the light source.

(4)
The light emitting apparatus according to (2) or (3), in which the light source includes LED (Light Emitting Diode).

(5)
The light emitting apparatus according to any one of (2) to (4), in which
the first surface and the second surface each have a rectangular shape, and
a projection provided on the first prism surface extends in a direction parallel to a short side of the rectangular shape.

(6)
The light emitting apparatus according to any one of (2) to (5), in which the light emitting section further includes a collimation section that is provided between the light source and the first optical sheet and collimates light outputted from the light source.

(7)
The light emitting apparatus according to any one of (2) to (6), in which each projection on the first prism surface has a plurality of surfaces having inclination angles that are different from each other with respect to the first surface.

(8)
The light emitting apparatus according to any one of (2) to (7), in which each projection on the first prism surface has a surface having an angle that is equal to or larger than 25 degrees with respect to a perpendicular line to the first surface.

(9)
The light emitting apparatus according to any one of (2) to (8), in which the optical component includes:
a second optical sheet having a second prism surface that faces the second surface of the liquid crystal section; and
a first adhesive layer provided on the second prism surface of the second optical sheet, and configures the interface between the first adhesive layer and the second prism surface.

(10)
The light emitting apparatus according to (9), in which an extending direction of a projection on the second prism surface is equal to or less than 45 degrees with respect to an extending direction of a projection on the first prism surface.

(11)
The light emitting apparatus according to any one of (2) to (10), in which the light emitting section further includes:
a third optical sheet disposed between the light source and the first optical sheet; and
a second adhesive layer that fixes the third optical sheet to the first prism surface.

(12)
A display apparatus including:
a liquid crystal panel having a liquid crystal layer between a first surface and a second surface that face each other;
a light emitting section that has a light output surface and outputs light from the light output surface with respect to the first surface in an oblique direction, the light output surface facing the first surface of the liquid crystal panel; and
an optical component facing the second surface of the liquid crystal panel and having an interface, the interface being inclined with respect to the second surface and having different refractive indices.

(13)
The display apparatus according to (12), in which the light emitting section is configured to control light emission locally.

(14)
The display apparatus according to (12) or (13), in which the liquid crystal panel is configured to be driven in a VA (Vertical Alignment) method.

The present application claims priority based on Japanese Patent Application No. 2017-170521 filed with the Japan Patent Office on Sep. 5, 2017, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:

1. A light emitting apparatus comprising:
a liquid crystal section having first and second surfaces and a liquid crystal layer between the first surface and the second surface that face each other;
a light emitting section that has a reflective polarizing film with a light output surface and outputs light from the light output surface with respect to the first surface in an oblique direction, the light output surface facing the first surface of the liquid crystal section; and
an optical component facing the second surface of the liquid crystal section, operable to receive light from the liquid crystal section, and having an interface portion and another interface portion, the interface portion being inclined with respect to the second surface, the another interface portion being parallel to the second surface, the interface portion and the another interface portion being bonded to the second surface by a first adhesive layer, and the interface portion and the another interface portion having refractive indices on a contact surface of the first adhesive layer that are different from a refractive index of the first adhesive layer,
wherein the optical component and the reflective polarizing film are on opposite sides of the liquid crystal section,
wherein the light emitting section includes a light source and a first optical sheet provided between the light source and the liquid crystal section in which the first optical sheet has a first prism surface disposed to face the light source,
wherein the light emitting section includes a collimation section that is provided between the light source and the first optical sheet that collimates light outputted from the light source, and
wherein the light emitting section further includes another optical sheet disposed between the light source and the first optical sheet and a second adhesive layer that fixes the another optical sheet to the first prism surface.

2. The light emitting apparatus according to claim 1, wherein the light emitting section is a direct backlight-type light emitting section.

3. The light emitting apparatus according to claim 2, wherein the first prism surface of the first optical sheet is disposed such that projections that form the first prism surface run parallel to a short side of the light emitting apparatus.

4. The light emitting apparatus according to claim 2, wherein the light source comprises LED (Light Emitting Diode) and a diffusion sheet is provided between the light source and the first optical sheet.

5. The light emitting apparatus according to claim 4, wherein the first prism surface comprises triangular-shaped projections.

6. The light emitting apparatus according to claim 2, wherein the first surface and the second surface each have a rectangular shape, and
a projection provided on the first prism surface extends in a direction parallel to a short side of the rectangular shape.

7. The light emitting apparatus according to claim 2, wherein the light emitting section further includes an air layer between the collimation section and the first optical sheet.

8. The light emitting apparatus according to claim 2, wherein each projection on the first prism surface has a plurality of surfaces having inclination angles that are different from each other with respect to the first surface.

9. The light emitting apparatus according to claim 2, wherein each projection on the first prism surface has a surface having an angle that is equal to or larger than 25 degrees with respect to a perpendicular line to the first surface.

10. The light emitting apparatus according to claim 2, wherein the optical component comprises:
a second optical sheet having a second prism surface that faces the second surface of the liquid crystal section; and
wherein the first adhesive layer is provided on the second prism surface of the second optical sheet.

11. The light emitting apparatus according to claim 10, wherein an extending direction of a projection on the second prism surface is equal to or less than 45 degrees with respect to an extending direction of a projection on the first prism surface.

12. The light emitting apparatus according to claim 1, wherein the interface portion being inclined with respect to the second surface at an angle that is greater than or equal to 65 degrees and less than or equal to 88 degrees.

13. The light emitting apparatus according to claim 2, wherein the first prism surface comprises triangular-shaped projections.

14. The light emitting apparatus according to claim 1, wherein the first prism surface comprises triangular-shaped projections.

15. A display apparatus comprising:
a liquid crystal section having first and second surfaces and a liquid crystal layer between the first surface and the second surface that face each other;
a light emitting section that has a reflective polarizing film with a light output surface and outputs light from the light output surface with respect to the first surface in an oblique direction, the light output surface facing the first surface of the liquid crystal section; and
an optical component facing the second surface of the liquid crystal section, operable to receive light from the liquid crystal section, and having an interface portion and another interface portion, the interface portion being inclined with respect to the second surface, the another interface portion being parallel to the second surface, the interface portion and the another interface portion being bonded to the second surface by a first adhesive layer, and the interface portion and the another interface portion having refractive indices on a contact surface of the first adhesive layer that are different from a refractive index of the first adhesive layer, wherein the optical component and the reflective polarizing film are on opposite sides of the liquid crystal section, wherein the light emitting section includes a light source and a first optical sheet provided between the light source and the liquid crystal section in which the first optical sheet has a first prism surface disposed to face the light source, wherein the light emitting section includes a collimation section that is provided between the light source and the first optical sheet that collimates light outputted from the light source and wherein the first prism surface comprises triangular-shaped projections.

16. The display apparatus according to claim 15, wherein the light emitting section further includes:
a another optical sheet disposed between the light source and the first optical sheet; and
a second adhesive layer that fixes the another optical sheet to the first prism surface.

17. The display apparatus according to claim 15, wherein the light emitting section is configured to control light emission locally.

18. The display apparatus according to claim 15, wherein the liquid crystal section is configured to be driven in a VA (Vertical Alignment) method.

19. A light emitting apparatus comprising:
a liquid crystal section having first and second surfaces and a liquid crystal layer between the first surface and the second surface that face each other;
a light emitting section that has a light output surface and outputs light from the light output surface with respect to the first surface in an oblique direction, the light output surface facing the first surface of the liquid crystal section; and
an optical component facing the second surface of the liquid crystal section, operable to receive light from the liquid crystal section, and having an interface portion and another interface portion, the interface portion being inclined with respect to the second surface, the another interface portion being parallel to the second surface, the interface portion and the another interface portion being bonded to the second surface by a first adhesive layer, and the interface portion and the another interface portion having refractive indices on a contact surface of the first adhesive layer that are different from a refractive index of the first adhesive layer, wherein the optical component and the light emitting section are on opposite sides of the liquid crystal section, wherein the light emitting section includes a light source and a first optical sheet provided between the light source and the liquid crystal section in which the first optical sheet has a first prism surface disposed to face the light source, wherein the light emitting section includes a collimation section that is provided between the light source and the first optical sheet that collimates light outputted from the light source, and wherein the first prism surface comprises triangular-shaped projections.

20. The light emitting apparatus according to claim 19, wherein the interface portion being inclined with respect to the second surface at an angle that is greater than or equal to 65 degrees and less than or equal to 88 degrees.

* * * * *